United States Patent [19]

Fisher

[11] 4,379,707
[45] Apr. 12, 1983

[54] SPLINED JOINTS

[75] Inventor: Leslie G. Fisher, Birmingham, England

[73] Assignee: BRD Company Limited, Aldridge, England

[21] Appl. No.: 296,524

[22] Filed: Aug. 26, 1981

[30] Foreign Application Priority Data

Aug. 29, 1980 [GB] United Kingdom ............... 8028008

[51] Int. Cl.³ .............................................. F16D 3/06
[52] U.S. Cl. .................................. 464/162; 403/359; 411/8
[58] Field of Search .................. 403/359, 13, 14, 342; 64/23; 411/8; 464/162

[56] References Cited

U.S. PATENT DOCUMENTS

| | | | |
|---|---|---|---|
| 3,352,194 | 11/1967 | Kausen | 411/8 |
| 3,367,142 | 2/1968 | Groves et al. | 64/23 |
| 4,131,375 | 12/1978 | Fisher | 403/13 |
| 4,142,807 | 3/1979 | Fisher et al. | 403/13 |

FOREIGN PATENT DOCUMENTS

| | | | |
|---|---|---|---|
| 1185624 | 3/1970 | United Kingdom | 64/23 |
| 1190165 | 4/1970 | United Kingdom | 403/359 |
| 1203245 | 8/1970 | United Kingdom | 403/13 |

Primary Examiner—Andrew V. Kundrat
Attorney, Agent, or Firm—Merriam, Marshall & Bicknell

[57] ABSTRACT

A splined joint between a shaft and a muff, with a support bearing in a tapered recess at the end of the muff and contractable onto the shaft to support same by a retaining member which is screwed onto the muff. The retaining member comprises a ring of a plastics or rubber material, the screw threads of which will yield to prevent over-tightening and possible binding of the bearing on the shaft.

5 Claims, 1 Drawing Figure

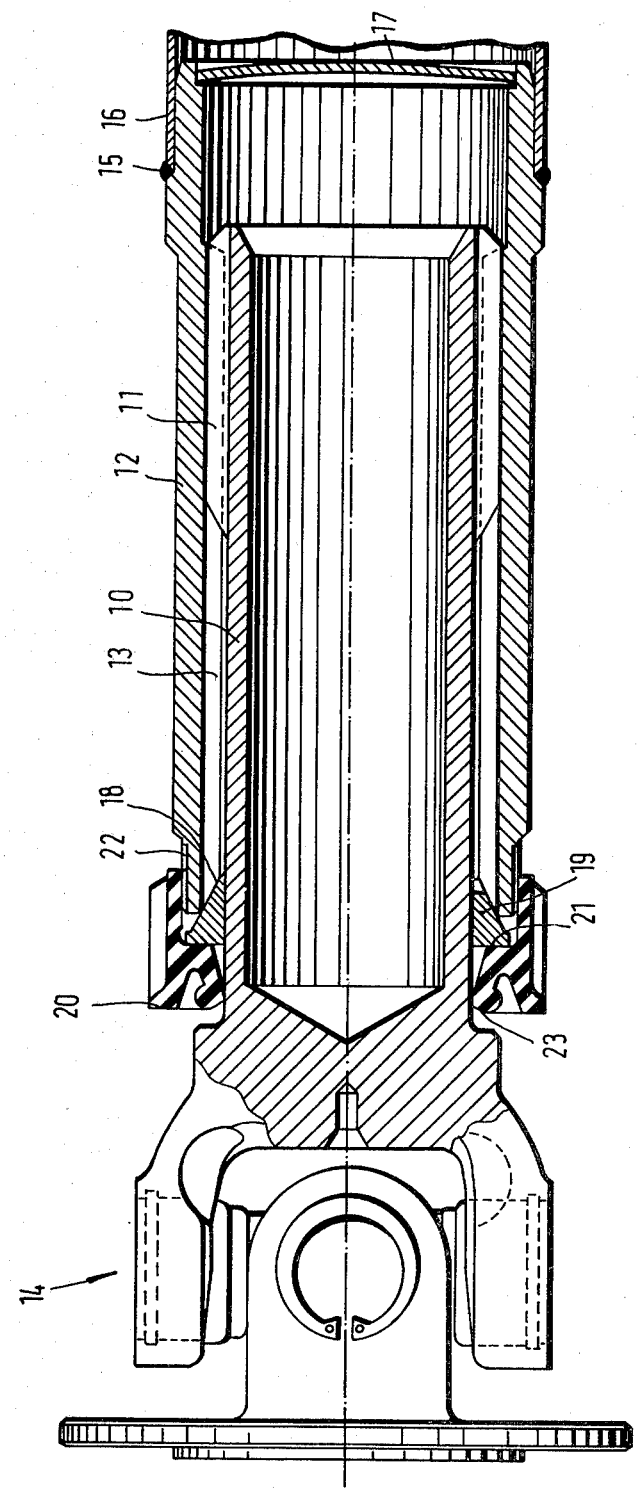

SPLINED JOINTS

BACKGROUND OF THE INVENTION

1. Field of the Invention

This invention relates to splined joints between rotary members, one of which is a male member, (herein called the shaft) and has a plurality of axially extending radially outwardly projecting teeth spaced apart angularly about its rotational axis, and the other of which is a female member (herein called the muff) and has a plurality of inwardly projecting teeth which interfit with the teeth of the shaft to permit relative axial sliding movement between the members whilst torque is transmitted between them. Such a joint will hereafter be referred to as a joint of the kind specified.

One of the problems encountered in such splined joints is that known as 'dog legging'. This means that the rotary axes of the shaft and muff become misaligned. This hinders free axial sliding between the shaft and muff, and in order to prevent this it has been proposed that the muff should carry a support bearing at or adjacent its open end. Such support bearing must fit the shaft sufficiently closely to support it, but not so closely as to cause binding between the shaft and muff, and it is an object of the present invention to provide a construction of splined joint in which the correct clearance between the support bearing and shaft is readily attained.

2. Summary of the Invention

According to the invention, we provide a splined joint of the kind specified with an annular support bearing engaging the shaft to support it, a retaining member holding the support bearing to the muff, a tapered surface to contract the support bearing onto the shaft, and screw threaded means by which the retaining member is engaged with the muff, the screw threaded means incorporating a yieldable element so that it cannot be overtightened to cause the support bearing to bind on to the shaft.

The retaining member may comprise a ring of rubber or plastics material which has direct screw threaded engagement with the muff. Any attempt to over-tighten the retaining ring to the muff will have the effect simply of causing the screw threads of the ring to ride over those of the muff without causing damage to either component, provided that suitable materials and dimensions of the screw threads are utilised. The retaining member may also serve as a seal for preventing dirt from getting into the splined joint.

DESCRIPTION OF PREFERRED EMBODIMENT

The invention will now be described by way of example with reference to the accompanying drawing, which is a section through a splined joint embodying the invention.

The illustrated splined joint comprises a male member or shaft 10 which has a plurality of radially outwardly extending circumferentially spaced spline teeth 11 adjacent its end. The shaft fits within a female member or muff 12 which has complementary inwardly extending teeth 13 which interfit with the teeth 11 of the shaft so that these two components can have torque transmitted between them while relative axial movement is permitted. As is known for such assemblies, the spline teeth of one of the members, usually the male member, carry an anti-friction coating, e.g. a suitable plastics material. The shaft 10 terminates in a hookes universal joint 14, and the muff 12 is welded at 15 to a tubular shaft 16, the end of the muff being closed by a welch plug 17.

The muff 12 has at its open end a tapered recess 18 which accommodates a support bearing 19. The bearing 19 is in the form of a split annulus so that it can be contracted onto the shaft 10 by being forced further into the recess 18. The bearing 19 may be made of a suitable plastics material, e.g. an appropriate grade of nylon.

The bearing 19 is held in place by a retaining member 20 which is in the form of a ring with an axially presented surface 21 which abuts the bearing 19. The ring 20 is internally screw threaded to engage with a screw thread 22 provided on the exterior of the muff at the end thereof. The member 20 is of a rubber or plastics material, and has a sealing lip 23 which engages the exterior of the shaft to prevent dirt from entering the splined joint.

When the splined joint is assembled, screwing the retaining member 20 onto the muff 12 forces the bearing 19 further into the tapered recess 18, thus contracting the bearing onto the shaft 10. This cannot, however, be done to an extent sufficient to cause the bearing 19 to bind onto the shaft and prevent free axial movement of the splined joint, because the screw threads of the retaining member 20, being of the rubber or plastics material, will ride over the screw threads on the end of the muff. The effect is analogous to the stripping of a screw thread, but permanent damage does not occur because of the nature of the material of the retaining member.

In the example above described, the retaining member screws directly on to the muff. It would be within the scope of the invention for there to be an intermediate member screw threaded to one or both components, or for separate screw threaded fasteners to be used, while making use of the same principle of a yieldable threaded connection. Further, although the described embodiment has the tapered recess in the end of the muff for receiving the bearing, it would be possible for the tapered surface which contracts the bearing, and possibly part or all of the recess, to be provided in the retaining member.

I claim:

1. A slidable splined joint between rotary members, comprising a male member having a plurality of axially extending radially outwardly projecting teeth spaced apart angularly about its rotational axis, a female member having a plurality of inwardly projecting teeth which interfit with the teeth of the male member, and an annular, radially contractible support bearing at the end of the female member engaging the male member to support the latter relative to the female member, wherein there is provided a retaining member by which the support bearing is held in engagement with the female member by way of a tapered surface for contracting the support bearing onto the male member, and screw threaded means by which the retaining member is engaged with the female member, said screw threaded means incorporating a yieldable element so that it cannot be overtightened to cause the support bearing to bind on the male member.

2. A splined joint according to claim 1 wherein the retaining member comprises a ring of a rubber or plastics material having direct screw-threaded engagement with the female member.

3. A splined joint according to claim 2 wherein the retaining member is provided with a sealing formation engaging the male member.

4. A splined joint according to claim 1 wherein the support bearing is disposed in a recess at the end of the female member, said recess affording said tapered surface.

5. A splined joint according to claim 1 wherein the support bearing is a split annulus of a plastics material.